C. MILLER.
Pruning Implements.
No. 152,759.
Patented July 7, 1874.
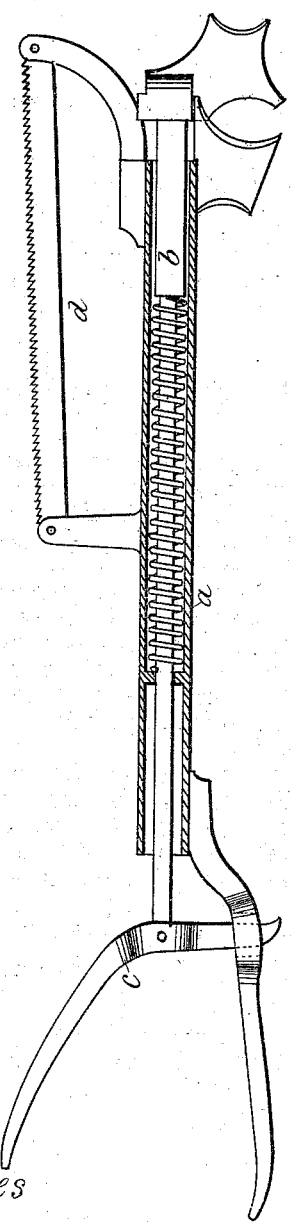
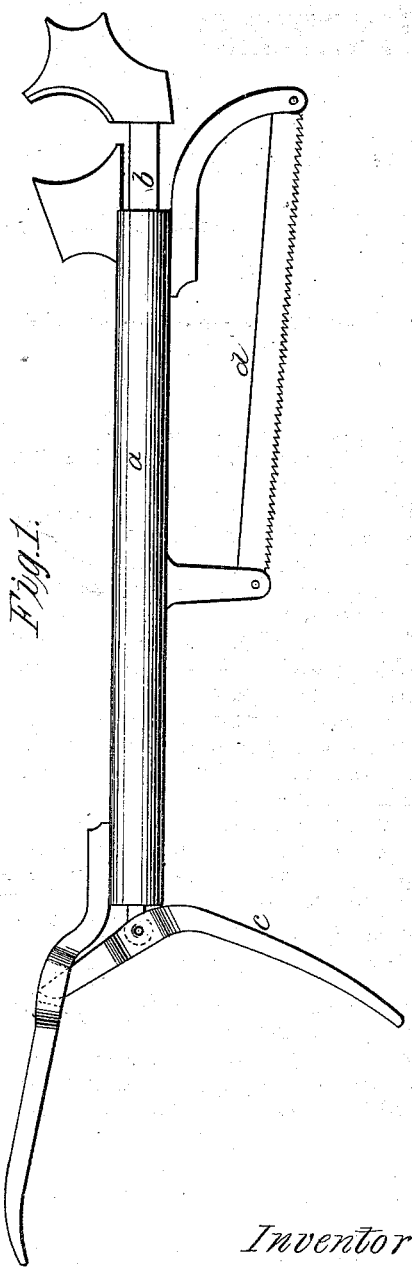
Witnesses
Christian Wagner
John Otten
Inventor
Charles Miller

UNITED STATES PATENT OFFICE.

CHARLES MILLER, OF BOONVILLE, MISSOURI.

IMPROVEMENT IN PRUNING IMPLEMENTS.

Specification forming part of Letters Patent No. 152,759, dated July 7, 1874; application filed April 29, 1874.

*To all whom it may concern:*

Be it known that I, CHARLES MILLER, of the city of Boonville, in the county of Cooper and State of Missouri, have invented a new and Improved Pruning-Shear and Hedge-Trimmer; and I do hereby declare that the following is a full and exact description of the said invention.

The nature of my invention consists in two steel-tempered cutting-edges passing by one another like a pair of shears, thus cutting into what is brought in contact with their respective passages, one blade forming a part of a tube, and the other attached to a rod passing through said tube.

$a$ is a hollow tube with a fixed handle at the lower end and a steel-tempered cutting-edge at the other. Said cutting-edge at the lower end forms a hook, which will cut when pulling on it. $b$ is a round bar, which passes through the inside of tube $a$, and connects at the lower end with a movable handle or lever, $c$, by means of a joint. Said movable handle $c$ enters into the fixed handle on tube $a$, and forms another joint by means of a slot, thus giving an up-and-down motion to bar $b$, when handle $c$ is moved. Said bar $b$ has a steel cutter on the top, which slides in a back piece of iron to guide the cutting-edge to match. The very top of the cutter serves as a knife to be operated with when pushing. Bar $b$ fits on the upper end in tube $a$, but lower down it is small enough to admit a curled-wire spring to drive it up again without aid. $d$ is a saw-blade fastened into two arms attached to tube $a$, of which one serves as a guide for the moving cutter-bar $b$. The whole forms a combined tool of two knives, one used when pushed, the other when pulled; one shear and a saw, to be sufficient for all kinds of pruning and hedge-trimming operations.

I claim—

The combination of the tube with the slotted handle, the lugs for the saw, and the lower blade, all of a single piece of metal, or each severally attached to the tube, and the spring-rod passing within said tube, and having the upper blade forming an integral part therewith, all as and for the purposes set forth.

CHARLES MILLER.

Witnesses:
CHRISTIAN WAGNER,
JOHN OTTEN.